United States Patent
Sung et al.

(10) Patent No.: US 10,552,489 B2
(45) Date of Patent: *Feb. 4, 2020

(54) DYNAMICALLY UPDATABLE OFFLINE GRAMMAR MODEL FOR RESOURCE-CONSTRAINED OFFLINE DEVICE

(71) Applicant: Google LLC, Mountain View, CA (US)

(72) Inventors: Sangsoo Sung, Palo Alto, CA (US);
Yuli Gao, Sunnyvale, CA (US);
Prathab Murugesan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,049

(22) Filed: Feb. 4, 2018

(65) Prior Publication Data
US 2018/0157673 A1   Jun. 7, 2018

Related U.S. Application Data

(63) Continuation of application No. 14/723,305, filed on May 27, 2015, now Pat. No. 9,922,138.

(51) Int. Cl.
*G06F 17/00* (2019.01)
*G06F 16/9032* (2019.01)
(Continued)

(52) U.S. Cl.
CPC .... *G06F 16/90324* (2019.01); *G06F 16/2228* (2019.01); *G06F 16/243* (2019.01);
(Continued)

(58) Field of Classification Search
CPC .............................. G06F 17/3097; G10L 15/26
(Continued)

(56) References Cited

U.S. PATENT DOCUMENTS

| 7,197,331 B2 | 3/2007 | Anastasakos et al. |
| 7,606,708 B2 | 10/2009 | Hwang |

(Continued)

FOREIGN PATENT DOCUMENTS

| CN | 104508739 A | 4/2015 |
| EP | 2804113 A2 | 11/2014 |

(Continued)

OTHER PUBLICATIONS

The China National Intellectual Property Administration; Notification of First Office Action in Application No. 201680018964.6, 18 pages, dated Sep. 7, 2018.

(Continued)

*Primary Examiner* — Daniel Abebe
(74) *Attorney, Agent, or Firm* — Middleton Reutlinger

(57) ABSTRACT

An offline semantic processor of a resource-constrained voice-enabled device such as a mobile device utilizes an offline grammar model with reduced resource requirements to parse voice-based queries received by the device. The offline grammar model may be generated from a larger and more comprehensive grammar model used by an online voice-based query processor, and the generation of the offline grammar model may be based upon query usage data collected from one or more users to enable a subset of more popular voice-based queries from the online grammar model to be incorporated into the offline grammar model. In addition, such a device may collect query usage data and upload such data to an online service to enable an updated offline grammar model to be generated and downloaded back to the device and thereby enable a dynamic update of the offline grammar model to be performed.

19 Claims, 5 Drawing Sheets

(51) Int. Cl.
*G10L 17/22* (2013.01)
*G06F 16/242* (2019.01)
*G06F 16/22* (2019.01)
*G10L 15/19* (2013.01)
*G10L 15/30* (2013.01)
*G06F 16/33* (2019.01)
*G06F 17/27* (2006.01)

(52) U.S. Cl.
CPC .......... *G06F 16/2425* (2019.01); *G10L 15/19* (2013.01); *G10L 15/30* (2013.01); *G10L 17/22* (2013.01); *G06F 16/3344* (2019.01); *G06F 17/271* (2013.01); *G06F 17/274* (2013.01)

(58) Field of Classification Search
USPC ....................................................... 704/243
See application file for complete search history.

(56) References Cited

U.S. PATENT DOCUMENTS

| | | | |
|---|---|---|---|
| 7,689,420 | B2 | 3/2010 | Paek et al. |
| 7,729,913 | B1 | 6/2010 | Lee et al. |
| 7,840,405 | B1 | 11/2010 | Lee et al. |
| 8,195,468 | B2 | 6/2012 | Weider et al. |
| 8,447,607 | B2 | 5/2013 | Weider et al. |
| 8,826,428 | B2 * | 9/2014 | Wang ................. H04L 63/1416 726/22 |
| 8,949,130 | B2 | 2/2015 | Phillips |
| 9,639,855 | B2 | 5/2017 | Balasubramanian et al. |
| 2002/0042707 | A1 | 4/2002 | Zhao et al. |
| 2002/0087315 | A1 | 7/2002 | Lee et al. |
| 2002/0169600 | A1 | 11/2002 | Busayapongchai et al. |
| 2003/0171926 | A1* | 9/2003 | Suresh ................ H04M 3/4938 704/270.1 |
| 2005/0043953 | A1 | 2/2005 | Winterkamp et al. |
| 2007/0124134 | A1 | 5/2007 | Van Kommer |
| 2007/0239454 | A1 | 10/2007 | Paek et al. |
| 2007/0276651 | A1 | 11/2007 | Bliss et al. |
| 2011/0044435 | A1 | 2/2011 | Bachran et al. |
| 2011/0071827 | A1 | 3/2011 | Lee et al. |
| 2012/0253799 | A1 | 10/2012 | Bangalore et al. |
| 2013/0332162 | A1 | 12/2013 | Keen |
| 2013/0346077 | A1 | 12/2013 | Mengibar et al. |
| 2014/0337007 | A1 | 11/2014 | Waibel et al. |
| 2014/0337032 | A1 | 11/2014 | Aleksic et al. |
| 2015/0025890 | A1 | 1/2015 | Jagatheesan et al. |
| 2015/0032443 | A1 | 1/2015 | Karov et al. |
| 2015/0269176 | A1 | 9/2015 | Marantz et al. |
| 2015/0379989 | A1 | 12/2015 | Balasubramanian et al. |

FOREIGN PATENT DOCUMENTS

| | | |
|---|---|---|
| WO | 2014186143 | 11/2014 |
| WO | 2015009086 | 1/2015 |

OTHER PUBLICATIONS

International Search Report and Written Opinion of PCT Serial No. PCT/US16/033649 dated Sep. 29, 2016.
European Patent Office; Extended European Search Report, issued in Application No. EP18175418.5, dated Jun. 21, 2018.
European Patent Office; Examination Report issued in Application No. 18175418.5 dated May 27, 2019.
European Patent Office; Examination Report issued in Application No. 18175418.5 dated Nov. 22, 2019.

* cited by examiner

DYNAMICALLY UPDATABLE OFFLINE GRAMMAR MODEL FOR RESOURCE-CONSTRAINED OFFLINE DEVICE

BACKGROUND

Voice-based user interfaces are increasingly being used in the control of computers and other electronic devices. One particularly useful application of a voice-based user interface is with portable electronic devices such as mobile phones, watches, tablet computers, head-mounted devices, virtual or augmented reality devices, etc. Another useful application is with vehicular electronic systems such as automotive systems that incorporate navigation and audio capabilities. Such applications are generally characterized by non-traditional form factors that limit the utility of more traditional keyboard or touch screen inputs and/or usage in situations where it is desirable to encourage a user to remain focused on other tasks, such as when the user is driving or walking.

Voice-based user interfaces have continued to evolve from early rudimentary interfaces that could only understand simple and direct commands to more sophisticated interfaces that respond to natural language requests and that can understand context and manage back-and-forth dialogs or conversations with users. Many voice-based user interfaces incorporate both an initial speech-to-text conversion that converts an audio recording of a human voice to text, and a semantic analysis that analysis the text in an attempt to determine the meaning of a user's request. Based upon a determined meaning of a user's recorded voice, an action may be undertaken such as performing a search or otherwise controlling a computer or other electronic device.

The computing resource requirements of a voice-based user interface, e.g., in terms of processor and/or memory resources, can be substantial, and as a result, some conventional voice-based user interface approaches employ a client-server architecture where voice input is received and recorded by a relatively low-power client device, the recording is transmitted over a network such as the Internet to an online service for speech-to-text conversion and semantic processing, and an appropriate response is generated by the online service and transmitted back to the client device. Online services can devote substantial computing resources to processing voice input, enabling more complex speech recognition and semantic analysis functionality to be implemented than could otherwise be implemented locally within a client device. However, a client-server approach necessarily requires that a client be online (i.e., in communication with the online service) when processing voice input. Particularly in mobile and automotive applications, continuous online connectivity may not be guaranteed at all times and in all locations, so a client-server voice-based user interface may be disabled in a client device whenever that device is "offline" and thus unconnected to an online service.

SUMMARY

This specification is directed generally to various implementations that facilitate offline semantic processing in a resource-constrained voice-enabled device. An offline semantic processor of such a device utilizes an offline grammar model with reduced resource requirements to parse voice-based queries received by the device. In some implementations, the offline grammar model may be generated from a larger and more comprehensive grammar model used by an online voice-based query processor, and the generation of the offline grammar model may be based upon query usage data collected from one or more users to enable a subset of more popular voice-based queries from the online grammar model to be incorporated into the offline grammar model. In addition, in some implementations, such a device may collect query usage data and upload such data to an online service to enable an updated offline grammar model to be generated and downloaded back to the device and thereby enable a dynamic update of the offline grammar model to be performed.

Therefore, in some implementations, a method may maintain an online grammar model used by an online voice-based query processor to parse online voice-based queries, where the online grammar model maps a plurality of queries to one or more actions. Query usage data for at least a subset of the plurality of queries may be analyzed to identify a subset of popular queries from among the plurality of queries mapped by the online grammar model, and an offline grammar model that maps the subset of popular queries to actions among the one or more actions may be built for use by a resource-constrained offline device, where the offline grammar model has reduced resource requirements relative to the online grammar model and omits mappings for one or more queries among the plurality of queries.

Some implementations also include communicating the offline grammar model to the resource-constrained offline device for storage by the resource-constrained offline device and for use by an offline semantic processor of the resource-constrained offline device. In some implementations, communicating the offline grammar model to the resource-constrained offline device dynamically updates the offline grammar model stored in the resource-constrained offline device.

In some implementations, the query usage data includes query usage data collected for queries issued by a plurality of users. Further, in some implementations, the query usage data includes query usage data collected for voice-based queries issued by the plurality of users, and in some implementations, the query usage data includes voice-based query usage data collected for queries processed by the online voice-based query processor. In some implementations, the query usage data includes query usage data collected for voice-based queries issued by a user of the resource-constrained offline device and processed by an offline semantic processor of the resource-constrained offline device, and in some implementations, the query usage data includes query usage data collected for voice-based queries issued by a plurality of users of a plurality of resource-constrained offline devices and processed by offline semantic processors of the plurality of re-source-constrained offline devices.

In some implementations, the query usage data includes query usage data collected for text queries from the plurality of users, and in some implementations, the query usage data includes one or more query logs. Further, in some implementations, building the offline grammar model includes building a personalized offline grammar model for a user of the resource-constrained offline device based at least in part on query usage data collected from the resource-constrained offline device. In some implementations, analyzing the query usage data includes, for a first action among the one or more actions, determining a distribution of queries from among a plurality of queries mapped to the first action by the online grammar model using the collected query usage data, and including a top N queries from among the plurality of queries mapped to the first action in the identified subset of popular queries. In still other implementations, building the offline grammar model includes training the offline grammar model using the subset of popular queries.

Some implementations also provide a method that includes, in a semantic processor of a resource-constrained offline device, processing voice-based queries issued by a user of the resource-constrained offline device using an offline grammar model stored in the resource-constrained offline device, where the offline grammar model maps a subset of popular queries from among a plurality of queries to one or more actions. The method also includes collecting query usage data for queries issued by the user with the resource-constrained offline device, uploading the query usage data from the resource-constrained offline device to an online service for use in updating the offline grammar model, receiving update data from the online service with the resource-constrained offline device, the update data generated based at least in part on the uploaded query usage data, and updating the offline grammar model stored in the resource-constrained offline device using the update data such that a voice-based query issued by the user after updating the offline grammar model is processed using the updated offline grammar model.

In some implementations, the query usage data includes query usage data associated with voice-based queries or text queries issued by the user with the resource-constrained offline device, and in some implementations, the update data is further generated based at least in part on query usage data for queries issued by a plurality of users. In some implementations, the update data includes the updated offline grammar model, and updating the offline grammar model includes storing the updated offline grammar model in the resource-constrained offline device. In addition, in some implementations, the updated offline grammar model is personalized for the user of the resource-constrained offline device.

In addition, some implementations include an apparatus including memory and one or more processors operable to execute instructions stored in the memory, where the instructions are configured to perform any of the aforementioned methods. Some implementations also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

In the implementations discussed hereinafter, an offline semantic processor of a resource-constrained voice-enabled device utilizes an offline grammar model with reduced resource requirements to parse voice-based queries received by the device. In some implementations, the offline grammar model may be generated from a larger and more comprehensive grammar model used by an online voice-based query processor, and the generation of the offline grammar model may be based upon query usage data collected from one or more users to enable a subset of more popular voice-based queries from the online grammar model to be incorporated into the offline grammar model. In addition, in some implementations, such a device may collect query usage data and upload such data to an online service to enable an updated offline grammar model to be generated and downloaded back to the device and thereby enable a dynamic update of the offline grammar model to be performed.

Further details regarding selected implementations are discussed hereinafter. It will be appreciated however that other implementations are contemplated so the implementations disclosed herein are not exclusive.

Example Hardware and Software Environment

Figure 1:
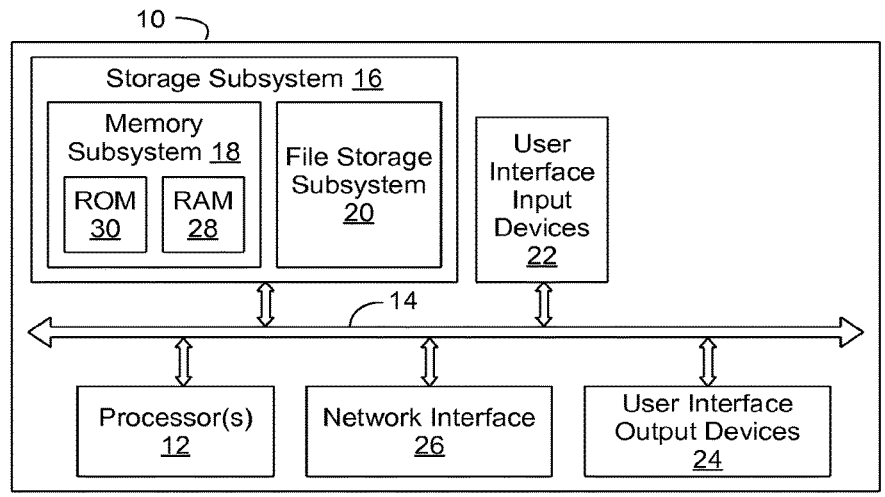
FIG. 1 illustrates an example architecture of a computer system.

Now turning to the Drawings, wherein like numbers denote like parts throughout the several views, FIG. 1 is a block diagram of electronic components in an example computer system 10. System 10 typically includes at least one processor 12 that communicates with a number of peripheral devices via bus subsystem 14. These peripheral devices may include a storage subsystem 16, including, for example, a memory subsystem 18 and a file storage subsystem 20, user interface input devices 22, user interface output devices 24, and a network interface subsystem 26. The input and output devices allow user interaction with system 10. Network interface subsystem 26 provides an interface to outside networks and is coupled to corresponding interface devices in other computer systems.

In some implementations, user interface input devices 22 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 10 or onto a communication network.

User interface output devices 24 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 10 to the user or to another machine or computer system.

Storage subsystem 16 stores programming and data constructs that provide the functionality of some or all of the modules described herein. For example, the storage subsystem 16 may include the logic to perform selected aspects of the methods disclosed hereinafter.

These software modules are generally executed by processor 12 alone or in combination with other processors. Memory subsystem 18 used in storage subsystem 16 may include a number of memories including a main random access memory (RAM) 28 for storage of instructions and data during program execution and a read only memory (ROM) 30 in which fixed instructions are stored. A file storage subsystem 20 may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 20 in the storage subsystem 16, or in other machines accessible by the processor(s) 12.

Bus subsystem 14 provides a mechanism for allowing the various components and subsystems of system 10 to communicate with each other as intended. Although bus subsystem 14 is shown schematically as a single bus, alternative implementations of the bus subsystem may use multiple busses.

System 10 may be of varying types including a mobile device, a portable electronic device, an embedded device, a desktop computer, a laptop computer, a tablet computer, a wearable device, a workstation, a server, a computing cluster, a blade server, a server farm, or any other data processing system or computing device. In addition, functionality implemented by system 10 may be distributed among multiple systems interconnected with one another over one or more networks, e.g., in a client-server, peer-to-peer, or other networking arrangement. Due to the ever-changing nature of computers and networks, the description of system 10 depicted in FIG. 1 is intended only as a specific example for purposes of illustrating some implementations. Many other configurations of system 10 are possible having more or fewer components than the computer system depicted in FIG. 1.

Implementations discussed hereinafter may include one or more methods implementing various combinations of the functionality disclosed herein. Other implementations may include a non-transitory computer readable storage medium storing instructions executable by a processor to perform a method such as one or more of the methods described herein. Still other implementations may include an apparatus including memory and one or more processors operable to execute instructions, stored in the memory, to perform a method such as one or more of the methods described herein.

Various program code described hereinafter may be identified based upon the application within which it is implemented in a specific implementation. However, it should be appreciated that any particular program nomenclature that follows is used merely for convenience. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that some implementations may not be limited to the specific organization and allocation of program functionality described herein.

Furthermore, it will be appreciated that the various operations described herein that may be performed by any program code, or performed in any routines, workflows, or the like, may be combined, split, reordered, omitted, performed sequentially or in parallel and/or supplemented with other techniques, and therefore, some implementations are not limited to the particular sequences of operations described herein.

Distributed Voice Input Processing Environment

Figure 2:
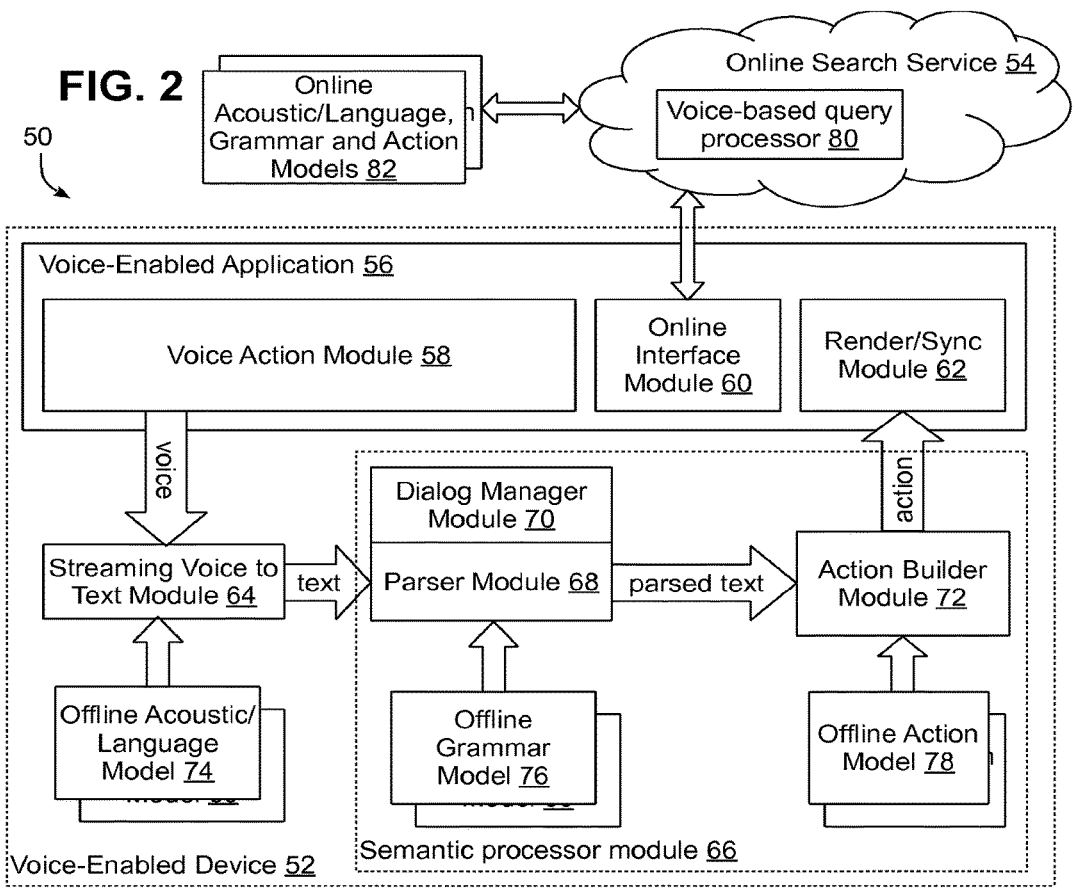
FIG. 2 is a block diagram of an example distributed voice input processing environment.

FIG. 2 illustrates an example distributed voice input processing environment 50, e.g., for use with a voice-enabled device 52 in communication with an online service such as online search service 54. In the implementations discussed hereinafter, for example, voice-enabled device 52 is described as a mobile device such as a cellular phone or tablet computer. Other implementations may utilize a wide variety of other voice-enabled devices, however, so the references hereinafter to mobile devices are merely for the purpose of simplifying the discussion hereinafter. Countless other types of voice-enabled devices may use the herein-described functionality, including, for example, laptop computers, watches, head-mounted devices, virtual or augmented reality devices, other wearable devices, audio/video systems, navigation systems, automotive and other vehicular systems, etc. Moreover, many of such voice-enabled devices may be considered to be resource-constrained in that the memory and/or processing capacities of such devices may be constrained based upon technological, economic or other reasons, particularly when compared with the capacities of online or cloud-based services that can devote virtually unlimited computing resources to individual tasks. Some such devices may also be considered to be offline devices to the extent that such devices may be capable of operating "offline" and unconnected to an online service at least a portion of time, e.g., based upon an expectation that such devices may experience temporary network connectivity outages from time to time under ordinary usage.

Online search service 54 in some implementations may be implemented as a cloud-based service employing a cloud infrastructure, e.g., using a server farm or cluster of high performance computers running software suitable for handling high volumes of requests from multiple users. In the illustrated implementation, online search service 54 is capable of querying one or more databases to locate requested information, e.g., to provide a list of web sites including requested information. Online search service 54 may not be limited to voice-based searches, and may also be capable of handling other types of searches, e.g., text-based searches, image-based searches, etc. In other implementations, an online system need not necessarily handle searching, and may be limited to handling voice-based requests for non-search actions such as setting alarms or reminders, managing lists, initiating communications with other users via phone, text, email, etc., or performing other actions that may be initiated via voice input. For the purposes of this disclosure, voice-based requests and other forms of voice input may be collectively referred to as voice-based queries, regardless of whether the voice-based queries seek to initiate a search, pose a question, issue a command, etc. In general, therefore, any voice input, e.g., including one or more words or phrases, may be considered to be a voice-based query within the context of the illustrated implementations.

In the implementation of FIG. 2, voice input received by voice-enabled device 52 is processed by a voice-enabled application (or "app") 56, which in some implementations may be a search application. In other implementations, voice input may be handled within an operating system or firmware of a voice-enabled device. Application 56 in the illustrated implementation includes a voice action module 58, online interface module 60 and render/synchronization module 62. Voice action module 58 receives voice input directed to the application and coordinates the analysis of the voice input and performance of one or more actions for a user of the voice-enabled device 52. Online interface module 60 provides an interface with online search service 54, including forwarding voice input to service 54 and receiving responses thereto. Render/synchronization module 62 manages the rendering of a response to a user, e.g., via a visual display, spoken audio, or other feedback interface suitable for a particular voice-enabled device. In addition, in some implementations, module 62 also handles synchronization with online search service 54, e.g., whenever a response or action affects data maintained for the user in the online search service (e.g., where voice input requests creation of an appointment that is maintained in a cloud-based calendar).

Application 56 relies on various middleware, framework, operating system and/or firmware modules to handle voice input, including, for example, a streaming voice to text module 64 and a semantic processor module 66 including a parser module 68, dialog manager module 70 and action builder module 72.

Module 64 receives an audio recording of voice input, e.g., in the form of digital audio data, and converts the digital audio data into one or more text words or phrases (also referred to herein as tokens). In the illustrated implementation, module 64 is also a streaming module, such that voice input is converted to text on a token-by-token basis and in real time or near-real time, such that tokens may be output from module 64 effectively concurrently with a user's speech, and thus prior to a user enunciating a complete spoken request. Module 64 may rely on one or more locally-stored offline acoustic and/or language models 74, which together model a relationship between an audio signal and phonetic units in a language, along with word sequences in the language. In some implementations, a single model 74 may be used, while in other implementations, multiple models may be supported, e.g., to support multiple languages, multiple speakers, etc.

Whereas module 64 converts speech to text, module 66 attempts to discern the semantics or meaning of the text output by module 64 for the purpose or formulating an appropriate response. Parser module 68, for example, relies on one or more offline grammar models 76 to map text to particular actions and to identify attributes that constrain the performance of such actions, e.g., input variables to such actions. In some implementations, a single model 76 may be used, while in other implementations, multiple models may be supported, e.g., to support different actions or action domains (i.e., collections of related actions such as communication-related actions, search-related actions, audio/visual-related actions, calendar-related actions, device control-related actions, etc.)

As an example, an offline grammar model 76 may support an action such as "set a reminder" having a reminder type parameter that specifies what type of reminder to set, an item parameter that specifies one or more items associated with the reminder, and a time parameter that specifies a time to activate the reminder and remind the user. Parser module 64 may receive a sequence of tokens such as "remind me to," "pick up," "bread," and "after work" and map the sequence of tokens to the action of setting a reminder with the reminder type parameter set to "shopping reminder," the item parameter set to "bread" and the time parameter of "5:00 pm,", such that at 5:00 pm that day the user receives a reminder to "buy bread."

Parser module 68 may also work in conjunction with a dialog manager module 70 that manages a dialog with a user. A dialog, within this context, refers to a set of voice inputs and responses similar to a conversation between two individuals. Module 70 therefore maintains a "state" of a dialog to enable information obtained from a user in a prior voice input to be used when handling subsequent voice inputs. Thus, for example, if a user were to say "remind me to pick up bread," a response could be generated to say "ok, when would you like to be reminded?" so that a subsequent voice input of "after work" would be tied back to the original request to create the reminder.

Action builder module 72 receives the parsed text from parser module 68, representing a voice input interpretation and generates an action along with any associated parameters for processing by module 62 of voice-enabled application 56. Action builder module 72 may rely on one or more offline action models 78 that incorporate various rules for creating actions from parsed text. In some implementations, for example, actions may be defined as functions F such that $F(I_T)=A_U$, where T represents the type of the input interpretation and U represents the type of output action. F may therefore include a plurality of input pairs (T, U) that are mapped to one another, e.g., as $f(i_t)=a_u$, where $i_t$ is an input proto variable of type t, and $a_u$ is an output modular argument or parameter of type u. It will be appreciated that some parameters may be directly received as voice input, while some parameters may be determined in other manners, e.g., based upon a user's location, demographic information, or based upon other information particular to a user. For example, if a user were to say "remind me to pick up bread at the grocery store," a location parameter may not be determinable without additional information such as the user's current location, the user's known route between work and home, the user's regular grocery store, etc.

It will be appreciated that in some implementations models 74, 76 and 78 may be combined into fewer models or split into additional models, as may be functionality of modules 64, 68, 70 and 72. Moreover, models 74-78 are referred to herein as offline models insofar as the models are stored locally on voice-enabled device 52 and are thus accessible offline, when device 52 is not in communication with online search service 54.

Furthermore, online search service 54 generally includes complementary functionality for handling voice input, e.g., using a voice-based query processor 80 that relies on various acoustic/language, grammar and/or action models 82. It will be appreciated that in some implementations, particularly when voice-enabled device 52 is a resource-constrained device, voice-based query processor 80 and models 82 used thereby may implement more complex and computational resource-intensive voice processing functionality than is local to voice-enabled device 52. In other implementations, however, no complementary online functionality may be used.

In some implementations, both online and offline functionality may be supported, e.g., such that online functionality is used whenever a device is in communication with an online service, while offline functionality is used when no connectivity exists. In other implementations different actions or action domains may be allocated to online and offline functionality, and while in still other implementations, online functionality may be used only when offline functionality fails to adequately handle a particular voice input.

Figure 3:
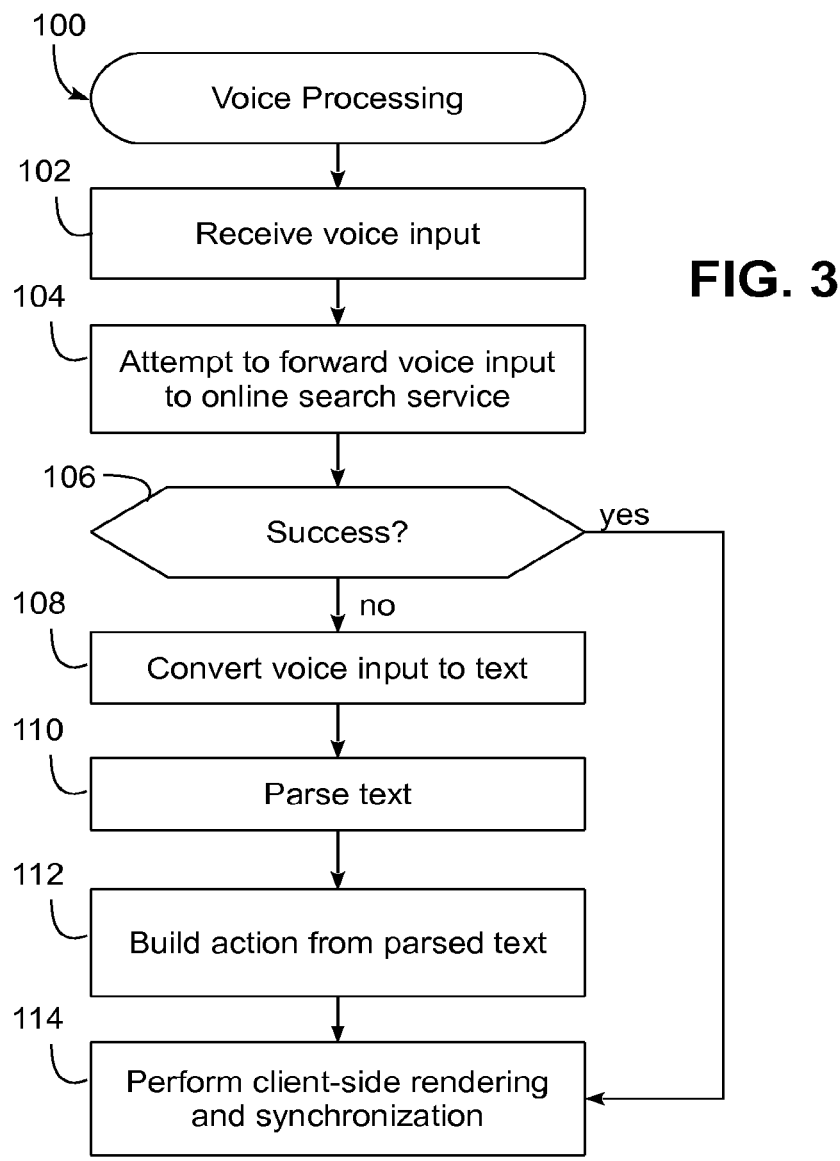
FIG. 3 is a flowchart illustrating an example method of processing a voice input using the environment of FIG. 2.

FIG. 3, for example, illustrates a voice processing routine 100 that may be executed by voice-enabled device 52 to handle a voice input. Routine 100 begins in block 102 by receiving voice input, e.g., in the form of a digital audio signal. In this implementation, an initial attempt is made to forward the voice input to the online search service (block 104). If unsuccessful, e.g., due to the lack of connectivity or the lack of a response from the online search service, block 106 passes control to block 108 to convert the voice input to text tokens (block 108, e.g., using module 64 of FIG. 2), parse the text tokens (block 110, e.g., using module 68 of FIG. 2), and build an action from the parsed text (block 112, e.g., using module 72 of FIG. 2). The resulting action is then used to perform client-side rendering and synchronization (block 114, e.g., using module 62 of FIG. 2), and processing of the voice input is complete.

Returning to block 106, if the attempt to forward the voice input to the online search service is successful, block 106 bypasses blocks 108-112 and passes control directly to block 114 to perform client-side rendering and synchronization. Processing of the voice input is then complete. It will be appreciated that in other implementations, as noted above, offline processing may be attempted prior to online processing, e.g., to avoid unnecessary data communications when a voice input can be handled locally.

Dynamically Updatable Offline Grammar Model for Resource-Constrained Offline Device As noted above, in some implementations, a voice-enabled device may be resource-constrained, and may lack the raw computing power and/or storage capabilities of an online service. Much of the complexity in connection with implementing a voice-based user interface is embodied in the models used by the various modules that implement such functionality, including, for example, the grammar models that map text to actions.

A grammar model, in this regard, may refer to any data structure suitable for mapping one or more text words or phrases (collectively referred to herein as "tokens") to one or more actions to be implemented by a device. The text words or phrases mapped to a particular action may also be considered to constitute distinct voice-based queries mapped to the action. A grammar model may be implemented, for example, as a transition state graph, or in other suitable data structures. Moreover, a grammar model may be generated in a number of manners, e.g., via programming, via training, etc.

An action may refer to practically any operation that may be performed by a particular device, such as performing a search, placing a call, sending a text message, sending an email, setting a reminder, getting directions, setting an appointment, changing a device setting, creating a note, playing a song or video, changing volume, etc. In some implementations, actions may be grouped into collections referred to as action domains, e.g., a communication action domain (for placing calls, sending messages, etc.), a media action domain (for playing songs, playing videos, etc.), a planning action domain (for creating reminders, creating appointments, etc.), and a navigation action domain (for displaying maps, obtaining directions, etc.), among others. It will be appreciated that grammar models may vary for different languages, for different speakers, as well as for different end user applications.

The utility of a grammar model is based at least in part on the number of different mappings created for different actions. Language is constantly evolving, and different speakers may speak different instructions to perform the same actions, e.g., based on differences in age, country, region, etc. The number of mappings embodied within a grammar model, however, generally increases both the amount of memory required to store the model, and the amount of processing time and resources required to identify a particular mapping in the model.

Figure 4:
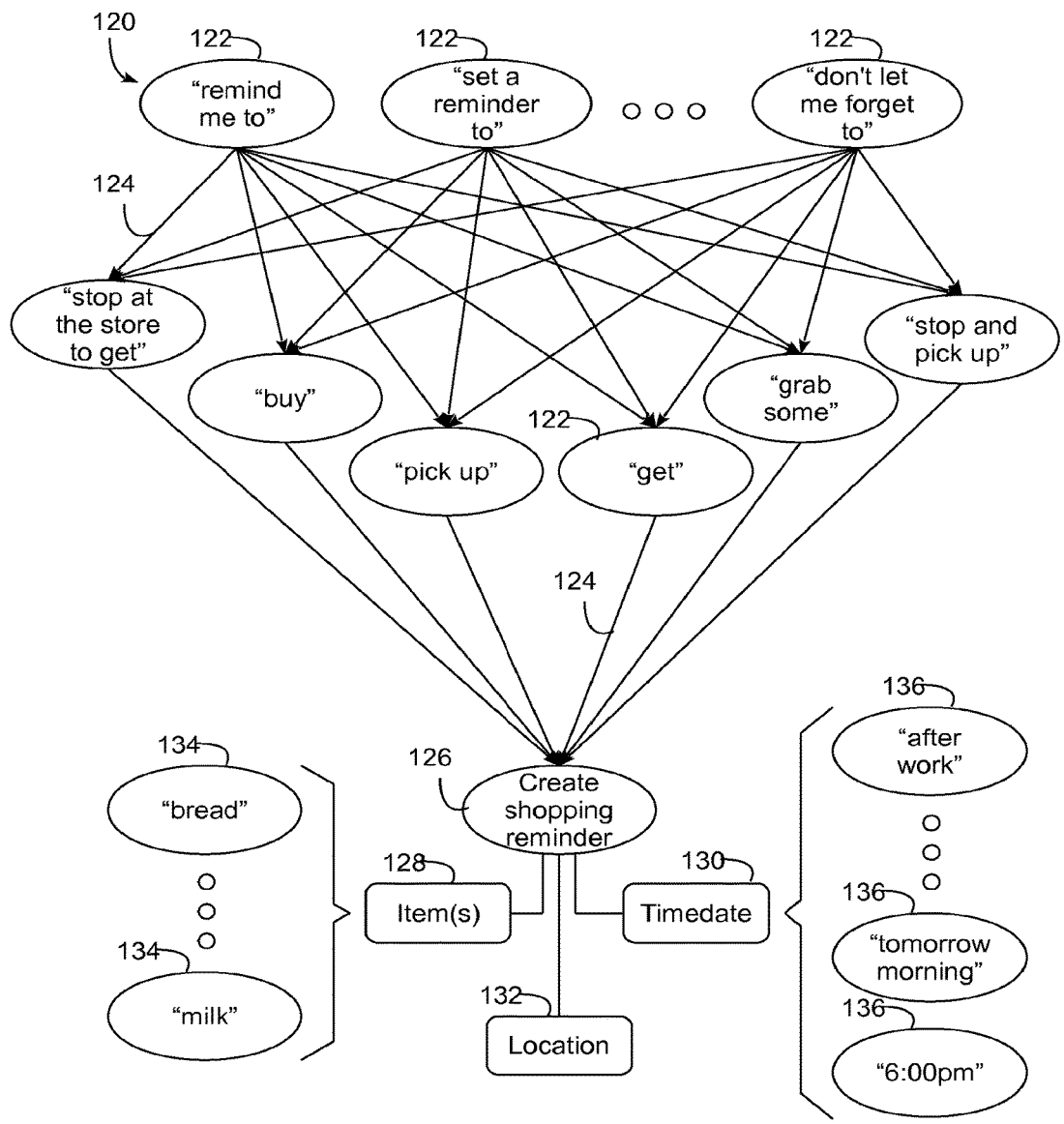
FIG. 4 illustrates an example grammar model for use in processing voice inputs in an action domain.

Given the extensive computing resources available in many online services, many such services employ large and complex grammar models capable of handling a wide variety of mappings. FIG. 4, for example, illustrates a portion of an example grammar model 120 implemented as a finite state transition graph incorporating a plurality of states 122 and transitions 124 mapped to a "create shopping reminder" action 126 having item, timedate, and location parameters 128, 130 and 132. As seen in the figure, multiple tokens are supported both for triggering a reminder (e.g., "remind me to," "set a reminder to," "don't let me forget to," etc.) and for specifying that the reminder is a shopping reminder (e.g., "stop at the store to get," "buy," "pick up," "get", "grab some," "stop and pick up," etc.), resulting in large number of potential mappings and thus synonymous phrases or voice-based queries that could be used to create a shopping reminder.

Moreover, for each parameter 128, 130, 132, a large number of potential values may be mapped within the grammar model. For the list of items 128, for example, countless product names and descriptions 134 may be possible (e.g., "bread," "milk," etc.), including both the generic terms for items as well as particular brand names. For the timedate parameter 130, various phrases 136 associated with times and/or dates may be supported, including both numerical values (e.g., "6:00 pm") and non-numerical values (e.g., "after work," "tomorrow morning," etc.). For the location parameter 132, addresses (e.g., "101 main street"), generic locations (e.g., "grocery store,"), business names (e.g., a particular grocery store), etc. may be specified. In some implementations, one or more parameters may be optional. In addition, in some implementations, one or more parameters may be defined based upon non-voice data, e.g., current GPS location, a user's favorite businesses, knowledge of a user's typical working hours, etc., and in some instances based upon a combination of voice and non-voice data (e.g., where a user states "grocery store" and this input, in combination with the user's known route home, is used to identify a particular grocery store along the route). Furthermore, parameters may be derived in some implementations based upon dialogs or conversations, such that the parameters are surmised at least in part from prior voice input.

Graph 120 represents only a small subset of the potential mappings that may be included in a grammar model, and it will be appreciated that in order to cover all possible variations of voice-based queries that might be received from a user, mappings for all of those possible variations would need to be incorporated into a grammar model. Online services, lacking many of the resource constraints of individual computers and electronic devices, have the luxury of incorporating large numbers of mappings to maximize the usefulness of a grammar model. As a consequence, however, the grammar models used by online services (which are referred to herein as online grammar models) are generally too large and/or too processor-intensive to be used in individual computers and electronic devices, particularly many of the types of devices having the greatest need for voice-based user interfaces.

In the implementations discussed herein, however, an offline grammar model may be generated as a subset of an online grammar model for use in a resource-constrained voice-enabled offline device, thereby accommodating the memory and/or processing limitations of the device. Moreover, the offline grammar model may be generated based upon historical query usage statistics such that some or all of the less frequently encountered voice-based queries are effectively pruned from the online grammar model, and such that the offline grammar model is configured to recognize some or all of the more frequently encountered voice-based queries from the online grammar model. As a result, the offline grammar model desirably includes more frequently encountered voice-based queries such that an offline semantic processor will desirably be responsive to more commonly used voice-based queries, while having reduced resource requirements as compared to an online grammar model.

In various implementations, an offline grammar model may be constructed based upon statistical query analysis and used by a mobile device or other resource-constrained voice-enabled offline device to perform semantic processing of a voice-based query. The offline grammar model may be, in some implementations, a subset of an online grammar model, e.g., including mappings for a subset of "popular" queries based upon the statistical query analysis. In this regard, a query may be determined to be "popular" based upon various query usage data, e.g., based upon a number or percentage of users that have issued the query, a number of times users have issued the query, a frequency that users have issued the query, or some combination thereof. As a result, not all of the queries supported by the online grammar model are incorporated into the offline grammar model, but the memory footprint of the offline grammar model and the processing requirements necessary for utilizing the offline grammar model are reduced to better account for the resource constraints of an offline device.

In some implementations, an online grammar model may be maintained and used by an online voice-based query processor to parse online voice-based queries. The online grammar model may be configured to map a plurality of queries to one or more actions, e.g., one or more actions in a collection such as an action domain. Query usage data for at least a subset of the plurality of queries, e.g., as may be determined from query logs or the like, may be analyzed to identify a subset of popular queries from among the plurality of queries mapped by the online grammar model. Then, based upon the analysis, an offline grammar model that maps the subset of popular queries to actions among the one or more actions may be built for use by a resource-constrained offline device, e.g., by training the offline grammar model using the subset of popular queries. Of note, the offline grammar model may have reduced resource requirements relative to the online grammar model and may omit mappings for one or more queries among the queries mapped in the corresponding online grammar model.

Figure 5:
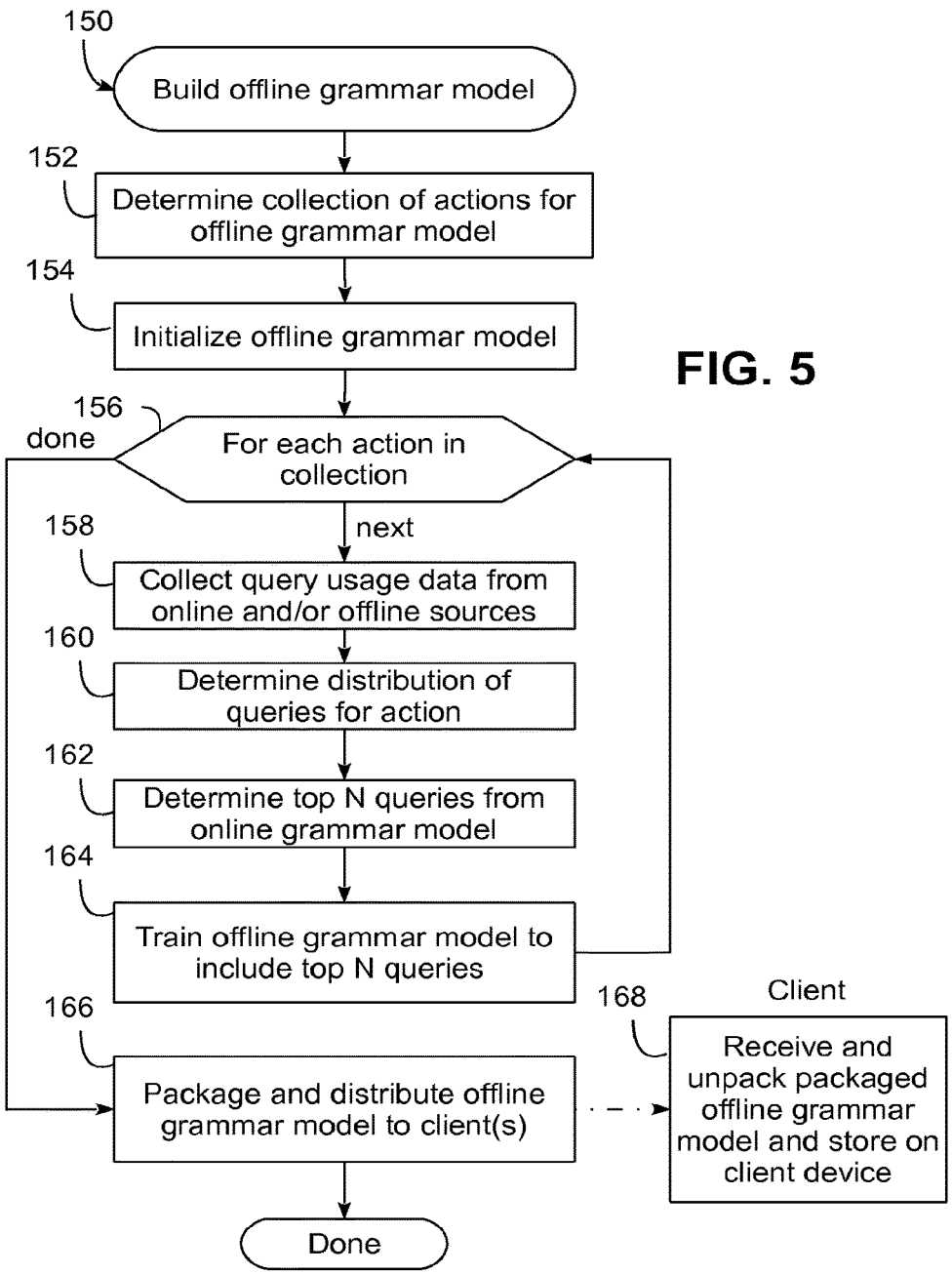
FIG. 5 is a flowchart illustrating an example method of building an offline grammar model.

FIG. 5, for example, illustrates a routine 150 suitable for execution by an online service to build an offline grammar model based at least in part on statistical and historical query analysis. Routine 150 may be executed by the same service that processes voice-based queries, or may a different service altogether. Moreover, routine 150 may be used to initially generate an offline grammar model, or to generate an updated offline grammar model that is used to replace a previously-generated offline grammar model.

Routine 150 begins in block 152 by determining a collection of actions to incorporate into an offline grammar model. The collection of actions may be related to one or more action domains, and may be limited in further respects, e.g., to particular languages, such as English.

Next, in block 154, an offline grammar model is initialized, e.g., without any existing mappings. Block 156 then initiates a FOR loop to process each action in the collection. For each such action, block 158 collects query usage data from online and/or offline sources and block 160 determines a distribution of queries for the action. Block 162 then determines a "top" N queries from the online query model based upon the distribution of queries, which will be incorporated into the offline grammar model.

Collected query usage data in some implementations may be limited to query usage data generated by online users, while in other implementations may be limited to query usage data generated by offline users. In other implementations, query usage data from both online and offline users may be collected.

In still other implementations, query usage data may be collected from all users of an online service or a population of offline devices, or query usage data may be collected from a subset of users, e.g., only users speaking a particular language, users from the same countries or geographical regions, only users sharing similar demographic characteristics, etc. Collected query usage data may be limited in some instances to voice-based queries, while in other instances, non-voice-based queries (e.g., text queries) may also be collected. In addition, in some implementations where "personalized" offline grammar models are constructed for individual users, collected query usage data may be focused on prior queries issued by particular users.

In some implementations, for example, query usage data may be collected from query logs maintained by offline devices and/or an online service. As will be discussed in greater detail below, such query logs may be collected in part by processing query usage data uploaded to an online service from offline devices. In this regard, query usage data may include any data that may be used to ascertain the relative popularity of one or more queries associated with a particular action, including, for example, queries themselves, query identifiers, query counts, user identifiers, etc.

The determination of a distribution of queries may be performed in a number of manners in different implementations to effectively determine a relative "popularity" of queries mapped to a particular action. For example, distributions may be determined by determining the number of times various queries have been issued, in some instances limited over a particular time period (e.g., over the last X months). As another example, distributions may be determined by determining the number of unique users issuing particular queries. In some implementations, weighting factors may be used to combine multiple indications of query popularity together within a distribution, e.g., to prioritize queries that are both issued frequently and issued by large numbers of users. In some implementations queries may also be weighted based upon additional data associated with such queries, e.g., the identity of the users issuing such queries. Doing so may enable, for example, queries issued by a particular user to be weighted more heavily when generating an offline grammar model for that particular user.

Once a distribution of queries is determined, the top N queries may be selected for inclusion in the offline grammar model. "Top" in this regard refers to the most popular queries as defined by the rules used to generate the distribution. Furthermore, the number N of such queries may vary in different implementations, e.g., based upon the overall size and/or complexity desired for an offline grammar model, the size and/or complexity to be allocated to the particular action, the number of other actions that will be incorporated into the model, the relative importance of the action to the other actions, etc. It will therefore be appreciated that when multiple actions are mapped within an offline grammar model, each action may have the same number of mapped queries in some instances, but have different numbers of mapped queries in others.

It will therefore be appreciated that blocks 158-162 perform a statistical and historical analysis of query usage data for one or more users to determine, from among the queries mapped to an action in an online grammar model, a subset of "popular" queries from among those queries to be incorporated into an offline grammar model. Thus, once the top N queries are determined, block 164 incorporates the top N queries into the offline grammar model. In some implementations, for example, a training technique may be used to incorporate the top N queries into the mode by effectively training the model. Control then passes to block 156 to process additional actions in the collection.

Once all actions in the collection are processed, block 156 passes control to block 166 to package and distribute the offline grammar model to one or more clients, i.e., one or more resource-constrained voice-enabled offline devices, which in turn receive and unpack the packaged offline grammar model and store the model on the respective devices (block 158). Packaging may be used to compress the offline grammar model to reduce transmission size and to otherwise format the model in a manner that is usable by the respective devices.

As noted above, in some instances routine 150 may be used to build an initial offline grammar model. In other instances, however, routine 150 may be used to update an offline grammar model, e.g., to better track changes in usage over time, to incorporate colloquialisms for specific populations of users and/or to personalize models for particular users based upon those users' particular query histories. Such updates may be considered to be dynamic updates in that a device may be updated either as a part of a system update, an application update or as a background update that is otherwise hidden from a user.

Figure 6:
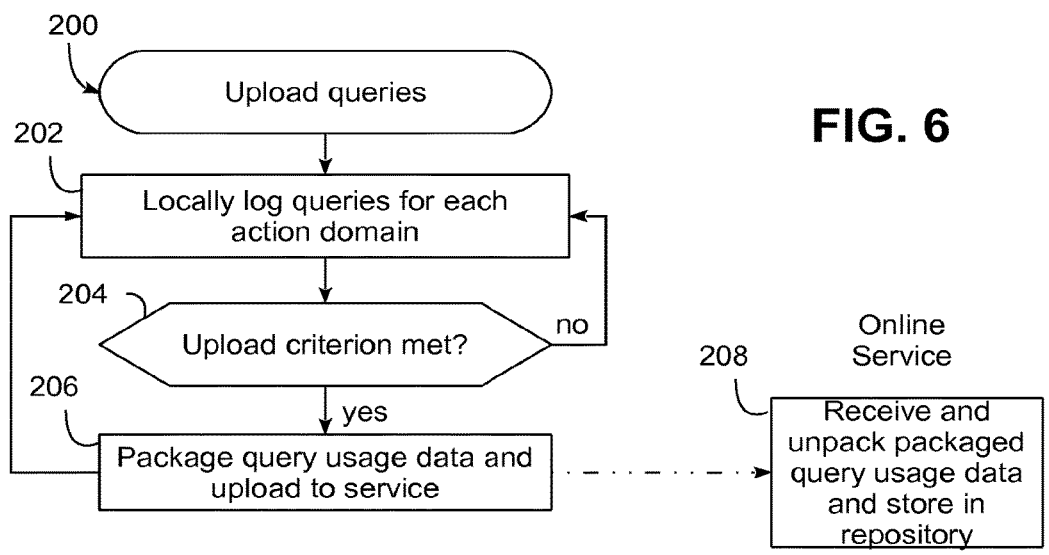
FIG. 6 is a flowchart illustrating an example method of uploading queries generated by a mobile device for use in updating an offline grammar model.

Now turning to FIG. 6, as noted above, in some implementations statistical and historical query analysis may be based at least in part on query usage data collected from offline devices. Thus, in some implementations it may be desirable to periodically upload query usage data from offline devices. FIG. 6 illustrates an upload query routine 200 that may be executed by an offline device to forward query usage data to an online service for later usage in updating or otherwise building an offline query model. Routine 200 begins in block 202 by locally logging queries issued by a user of the offline device for one or more action domains. Block 204 determines whether an upload criterion is met. In some implementations, the upload criterion may be time-based, e.g., to upload queries every day, every week, or some other time interval. In other implementations, however, the upload criterion may differ, and may be based, for example, on number of queries, amount of data to upload, or even responsive to a request from the online service.

If the upload criterion is not met, control returns to block 202 to continue logging queries. Otherwise, control passes to block 206 to package query usage data associated with the query log and upload the packaged data to the online service, and then return to logging queries in block 202. As shown in block 208, the packaged query usage data is received by the online service, unpacked and then stored in a repository for later analysis.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
    in a semantic processor of a resource-constrained offline device, processing voice-based queries issued by a user of the resource-constrained offline device using an offline grammar model stored in the resource-constrained offline device, wherein the offline grammar model maps a subset of queries from among a plurality of queries to one or more actions;
    collecting query usage data for queries issued by the user with the resource-constrained offline device;
    uploading the query usage data from the resource-constrained offline device to an online service for use in updating the offline grammar model;
    receiving update data from the online service with the resource-constrained offline device, the update data generated based at least in part on the uploaded query usage data; and
    updating the offline grammar model stored in the resource-constrained offline device using the update data such that a voice-based query issued by the user after updating the offline grammar model is processed using the updated offline grammar model.

2. The method of claim 1, wherein the query usage data includes query usage data associated with voice-based queries or text queries issued by the user with the resource-constrained offline device.

3. The method of claim 1, wherein the update data is further generated based at least in part on additional query usage data for queries issued by a plurality of users.

4. The method of claim 1, wherein the update data includes the updated offline grammar model, and wherein updating the offline grammar model includes storing the updated offline grammar model in the resource-constrained offline device.

5. The method of claim 1, wherein the updated offline grammar model is personalized for the user of the resource-constrained offline device.

6. The method of claim 1, further comprising:
    using, by the resource-constrained offline device, the updated offline grammar model, wherein using the updated offline grammar model comprises:

mapping text, outputted by a voice-to-text module of the resource-constrained offline device, to a corresponding action of the updated offline grammar model, and causing the corresponding action to be performed based on mapping the text to the corresponding action of the updated offline grammar model.

7. The method of claim 6, further comprising:
identifying, based on the text, attributes that constrain the corresponding action;
wherein causing the corresponding action to be performed comprises:
causing the corresponding action to be performed with the attributes that constrain the corresponding action.

8. The method of claim 7, further comprising:
performing, by the resource-constrained offline device, the corresponding action with the attributes.

9. The method of claim 1, further comprising:
determining lack of connectivity to an online voice-based query processor; and
in response to determining the lack of connectivity:
using, by the resource-constrained offline device, the updated offline grammar model in determining a corresponding action for a query issued with the resource-constrained offline device.

10. The method of claim 1, further comprising:
using, by the resource-constrained offline device, the updated offline grammar model in determining a corresponding action for a query issued with the resource-constrained offline device.

11. The method of claim 1, wherein the actions mapped by the updated offline grammar model include two or more of:
a setting an alarm action;
a setting a reminder action;
an initiating a communication action;
a playing a song action; and
a changing a device setting action.

12. A method, comprising:
maintaining an online grammar model used by an online voice-based query processor to parse online voice-based queries, the online grammar model mapping a plurality of queries to actions;
analyzing query usage data for at least a subset of the plurality of queries to identify a subset of queries from among the plurality of queries mapped by the online grammar model, wherein the query usage data includes query usage data collected for queries issued by a plurality of users;
building an offline grammar model that maps the subset of queries to actions among the actions for use by a resource-constrained offline device, wherein the offline grammar model has reduced resource requirements relative to the online grammar model;
communicating the offline grammar model to the resource-constrained offline device for storage by the resource-constrained offline device and for use by an offline semantic processor of the resource-constrained offline device, the offline semantic processor using the offline grammar model to locally map a query to a corresponding action of the offline grammar model, to thereby cause performance of the corresponding action in response to the query.

13. The method of claim 12, wherein analyzing the query usage data includes, for each of multiple actions among the actions:
determining a corresponding distribution of queries from among a plurality of corresponding queries mapped to the action by the online grammar model using the collected query usage data; and
including, in the identified subset of queries, at least a top corresponding query from among the plurality of corresponding queries mapped to the action.

14. The method of claim 12, wherein the actions mapped by the offline grammar model include two or more of:
a setting an alarm action;
a setting a reminder action;
an initiating a communication action;
a playing a song action; and
a changing a device setting action.

15. The method of claim 12, further comprising:
using, by the resource-constrained offline device, the offline grammar model, wherein using the offline grammar model comprises:
mapping a query, provided at the resource-constrained offline device, to a corresponding action of the offline grammar model, and
identifying attributes, for the corresponding action, that constrain the corresponding action.

16. The method of claim 15, further comprising:
causing, by the resource-constrained offline device, performance of the action with the attributes.

17. The method of claim 12, wherein using the offline grammar model is in response to determining lack of connectivity to the online voice-based query processor.

18. The method of claim 12, wherein the query usage data includes query usage data collected for voice-based queries issued by a user of the resource-constrained offline device and processed by the offline semantic processor of the resource-constrained offline device.

19. A resource-constrained offline device including memory and one or more processors operable to execute instructions stored in the memory, comprising instructions to:
process voice-based queries issued by a user of the resource-constrained offline device using an offline grammar model stored in the resource-constrained offline device, wherein the offline grammar model maps a subset of queries from among a plurality of queries to one or more actions;
upload query data, related to the voice-based queries issued by the user, to an online service for use in updating the offline grammar model;
receive update data from the online service with the resource-constrained offline device, the update data generated based at least in part on the uploaded query data; and
update the offline grammar model stored in the resource-constrained offline device using the update data such that a voice-based query issued by the user after updating the offline grammar model is processed using the updated offline grammar model.

* * * * *